United States Patent [19]

Soroushian et al.

[11] Patent Number: 4,902,347

[45] Date of Patent: Feb. 20, 1990

[54] POLYAMIDE FIBERS, MICROSILICA AND PORTLAND CEMENT COMPOSITES AND METHOD FOR PRODUCTION

[75] Inventors: Parviz Soroushian; Mohamad Z. Bayasi, both of East Lansing, Mich.

[73] Assignee: Board of Trustees operating Michigan State University, East Lansing, Mich.

[21] Appl. No.: 174,207

[22] Filed: Mar. 28, 1988

[51] Int. Cl.$^4$ ............................................. C04B 14/38
[52] U.S. Cl. ...................................... 106/99; 428/395; 428/688
[58] Field of Search .................. 106/99; 428/395, 688

[56] References Cited

U.S. PATENT DOCUMENTS

| | | | |
|---|---|---|---|
| Re. 27,061 | 2/1971 | Rubenstein | 156/86 |
| Re. 27,144 | 6/1971 | Rubenstein | 425/59 |
| 3,380,259 | 4/1968 | Rubenstein | 405/155 |
| 3,384,522 | 5/1968 | Rubenstein | 156/242 |
| 3,424,203 | 1/1969 | Rubenstein | 138/98 |
| 3,489,626 | 1/1970 | Rubenstein | 156/86 |
| 3,532,132 | 10/1970 | Rubenstein | 138/172 |
| 3,679,445 | 7/1972 | Howe et al. | 106/88 |
| 3,949,144 | 4/1976 | Duff | 428/414 |
| 4,039,345 | 8/1977 | Emig et al. | 106/99 |
| 4,088,808 | 5/1978 | Cornwell | 428/409 |
| 4,310,861 | 1/1982 | Cornwell et al. | 264/309 |
| 4,414,262 | 8/1983 | Hartmann et al. | 428/222 |
| 4,450,128 | 5/1984 | Takeuchi | 264/70 |
| 4,460,720 | 7/1984 | Gaidis | 524/5 |
| 4,468,429 | 8/1984 | Takeda | 428/283 |
| 4,495,228 | 1/1985 | Cornwell | 427/385.5 |

FOREIGN PATENT DOCUMENTS

| | | | |
|---|---|---|---|
| 0165388 | 12/1985 | European Pat. Off. | 106/99 |
| 48-019849 | 6/1973 | Japan | 106/99 |
| 49-044099 | 11/1974 | Japan . | |
| 0887520 | 12/1981 | U.S.S.R. | 106/99 |
| 1305206 | 1/1973 | United Kingdom | 106/99 |

OTHER PUBLICATIONS

Walton, P. L., and Majiumdar, A. J., "Properties of Cement Composites Reinforced with Kevlar Fibers": Journal of Material Science, vol. 13, pp. 1075-1083, (1979).
Konczalski, P., et al., Journal of Reinforced Plastics and Composites, vol. 1, pp. 378-384, Oct. 1982.
Kirk-Othmer, 5, 163-187, (1979).
Meininger, R. C., Concrete International Journal, vol. 4, No. 5, 52-57, (1982).
Kirk-Othmer, 3, 213-242, (1978).

Primary Examiner—Mark L. Bell
Assistant Examiner—Anthony J. Green
Attorney, Agent, or Firm—Ian C. McLeod

[57] ABSTRACT

A hardened cementitious composite produced using conventional mixing techniques, including a microsilica-cement mixture and randomly distributed discontinuous polyamide fibers is described. Other mix ingredients used in forming the composite are superplasticizer, water and possibly aggregates and fly ash substituting for part of the Portland cement. The microsilica particles are essential in dispersing the fibers during the regular mixing, and in enhancing the fiber-cement interfacial bond. Microsilica also reduces the alkalinity of the matrix and helps in increasing the durability of polyamide fibers in the alkaline environment of cement. With their close spacing and superior bond to the matrix of the composite, the polyamide fibers are highly effective in increasing the ultimate tensile and flexural strength and in improving the ductility and toughness of the material.

19 Claims, 6 Drawing Sheets

DEFLECTION AT CENTER $V_f$ = VOLUME FRACTION OF FIBERS
FIBER LENGTH = 0.5in (12.7mm)

POLYAMIDE FIBERS, MICROSILICA AND PORTLAND CEMENT COMPOSITES AND METHOD FOR PRODUCTION

BACKGROUND OF THE INVENTION (1) Summary of the Invention

The present invention relates to improved discontinuous polyamide fiber and Portland cement containing plastic (fluid) cementitious composites which set to form improved hardened composites. In particular, the present invention relates to plastic and hardened cementitious composites incorporating a mixture of the polyamide fibers and microsilica with the Portland cement to produce a hardened cementitious composite with improved flexural loading characteristics, tensile and compressive strength and ductility, and a method for the production of the composites which is useful on a large commercial scale.

(2) Prior Art

Attempts to incorporate discontinuous polyamide particularly aramide (Kevlar ®) fibers into cement matrices has been reported by Walter, P. L., and Majiumdar, A. J., "Properties of Cement Composites Reinforced with Kevlar Fibers", Journal of Material Science, V. 13, 1979, pp. 1075-1083 and by Konczalski, P., and Piekarski, K., "Tensile Properties of Portland Cement Reinforced with Kevlar Fibers", Journal of Reinforced Plastics and Composites, V. 1, October 1982, pp. 378-384. The absence of fiber dispersant in the cement compositions reported in the above references required the use of non-conventional manufacturing techniques, in particular either (1) spray-up followed by suction to dewater the plastic mixture with only partial success in dispersing fibers by Walter et al or (2) laying of aligned fibers in small specimens by Konczalski et al, which is not practical in large-scale applications and is different from random orientation and uniform dispersion of discontinuous fibers. Without a fiber dispersant, a desirable bond could not be developed between the polyamide fibers and Portland cement paste, and thus the tensile strength and post-peak behavior of the fibrous composite was damaged as can be seen from Walter et al.

The prior art has incorporated various fibers, particularly glass fibers, into cement. Illustrative are U.S. Pat. Nos. 3,380,259; 3,384,522; 3,424,203; 3,489,626 and 3,532,132 to Rubenstein; 3,679,445 to Howe et al; 3,949,144 to Duff; 4,039,345 to Emig et al; 4,310,486 to Cornwell et al; 4,414,262 to Hartmann et al; 4,450,128 to Takeuchi; 4,468,429 to Takeda; Re. 27,061 to Rubenstein and Re. 27,144 to Rubenstein. U.S. Pat. No. 4,310,486 to Cornwell et al describes the use of microsilica and a superplasticizer optionally with glass fibers. No improved results are shown with the fibers.

Japanese Patent No. 74 44099 describes a cementitious composite of various fibers including polyamide fibers prepared using 100-200 mesh serpentine (a naturally occurring hydrous magnesium silicate) as a dispersant. The particles were between 100-200 mesh (147 to 75 micron) which is quite large relative to the diameter of the polyamide fibers. The method is suitable for small specimens.

The problems with incorporating polyamide fibers into cement are related to the deterioration of the fibers in the alkali environment of portland cement paste (especially at higher temperatures) and poor dispersion of the fibers which result in inferior hardened cementitious products. The relatively large particles of Portland cement (compared to the polyamide fiber diameter) also adversely influence the bond between the fibers and portland cement paste. Another problem is to provide a method which is useful on a large commercial scale. The prior art has not solved these problems.

OBJECTS

It is therefore an object of the present invention to provide a hardened cementitious composite containing discontinuous polyamide fibers uniformly dispersed in the matrix which have (1) improved resistance to alkaline destruction of the fibers and (2) greater tensile, compressive and flexural strengths, ductilities and energy absorption capacities. Further it is an object of the present invention to provide a method for producing hardened composites which is simple, economical and reliable and which can be conducted on a large commercial scale. These and other objects will become increasingly apparent by reference to the following description and the drawings.

IN THE DRAWINGS

GENERAL DESCRIPTION

Figure 1A:
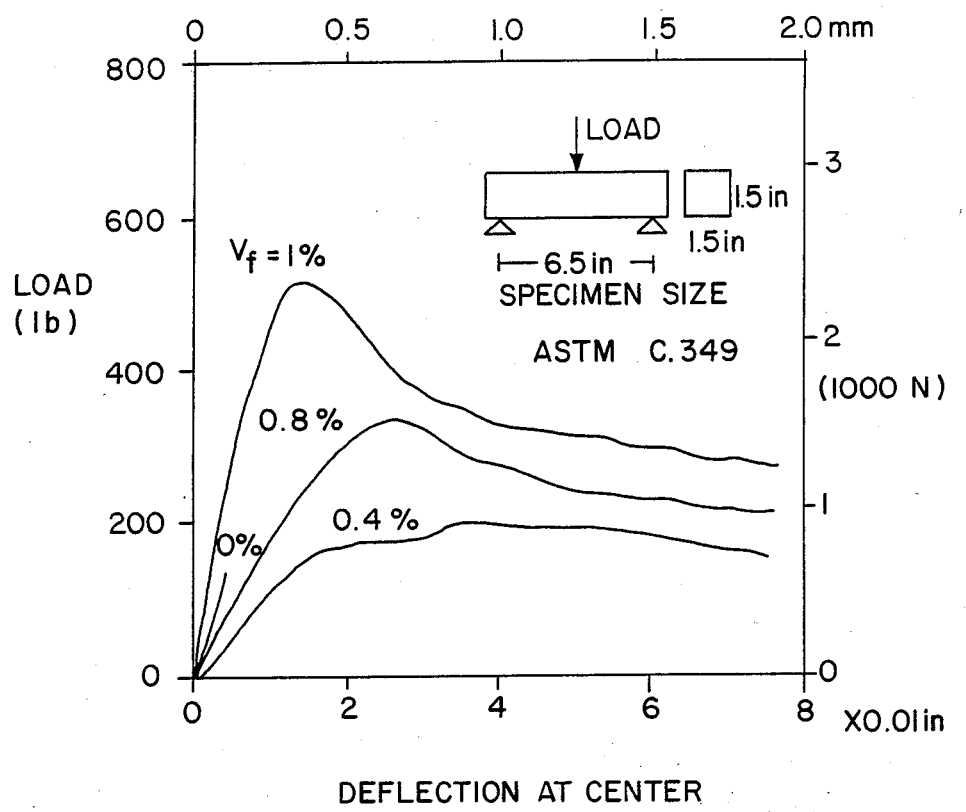
FIG. 1(a) is a graph showing beam loading vs. deflection for standard test beams (measuring 1.5" by 1.5"×6.5" with 4.8" between support points and loaded at midspan; 3.75 cm×3.75 cm×16.5 cm) prepared according to the method of the present invention without added aggregates.

The present invention relates to an improved plastic cementitious composition which cures to a rigid hardened cementitious composite incorporating in a mixture Portland cement, a superplasticizer, discontinuous polyamide fibers and water and optionally aggregates and optionally fly ash for part of the Portland cement, which comprises: microsilica coated on the fibers in the plastic mixture, wherein the microsilica particles have an average size between about 0.05 and 1 micron, wherein the hardened cementitious composite with the microsilica exhibits greater flexural and tensile strengths and ductilities than a similar composite with the fibers and without the microsilica. Preferably fly ash is used to replace up to forty-five percent (45%) by weight of the Portland cement. The composition can contain up to seventy-five percent (75%) by volume of the composite of aggregate.

Further, the present invention relates to a plastic cementitious composition which cures to a hardened cementitious composite which comprises in mixture: Portland cement; superplasticizer in a ratio by weight of between about 0.02 and 0.20 of the superplasticizer to the Portland cement; discontinuous polyamide fibers having a diameter between about 8 and 15 microns and a length between about 6 and 65 mm in a ratio by volume of between about 0.0005 and 0.04 of the fibers to the cementitious composition; wherein the fibers have been coated with microsilica in water and the superplasticizer prior to being provided in the mixture and wherein the particles of the microsilica have a size of between about 0.05 and 1 micron; water in a ratio by weight of between about 0.25 and 0.7 of the water to the Portland cement; optionally fly ash substituting for up to 45% by weight of the Portland cement; and optionally aggregates with maximum sizes up to 25 mm filling up to 75% of the volume of the composite.

Finally the present invention relates to an improved method of preparing a plastic cementitious composition which cures to a hardened cementitious composite incorporating a mixture of Portland cement and optionally aggregates and optionally fly ash, a superplasticizer, discontinuous polyamide fibers and water which comprises: uniformly dispersing and coating the fibers in a part of the water and the superplasticizer with microsilica and optionally a specific function of the aggregates needed for fiber dispersion, so that the fibers are uniformly dispersed and have a thin coating of the microsilica, the water and the superplasticizer; and mixing the microsilica coated fibers in the remainder of the mixture. The composite can contain up to seventy-five percent (75%) by volume of the aggregates. Optionally up to 45% by weight of the Portland cement can be replaced with fly ash.

Thus the present invention provides a new hardened cementitious composite consisting of microsilica, polyamide fiber, Portland cement, superplasticizer and water. This composite can be constructed using conventional mixing techniques, and yet it unexpectedly exhibits superior mechanical characteristics.

The practices for Portland cement-based concrete are set forth in the American Concrete Institute publication "ACI Manual of Concrete Practice", particularly Chapter 5 relating to water reducers also known as superplasticizers. The ASTM 1985 Book of Standards, Volume 4.02, sets forth the standards for concrete and is referenced as designation C494-82. The Portland cements are well known to those skilled in the art and are classed as hydraulic cements. A "hydraulic cement" is a cement which sets, hardens and does not disintegrate in water. Portland cement consists mainly of tricalcium silicate and dicalcium silicate; however, the exact composition varies with the manufacturer. These cements are particularly described in Kirk Othmer 5 163-187 (1979). The casting (molding) of concrete products from Portland cements is well known to those skilled in the art as shown by the patents previously referenced.

Pulverized fly ash is a by-product of coal usage in thermal power stations. The practices related to fly ash applications to concrete are set forth in the ASTM 1986 Book of Standards, Volume 4.02 under the designation C618. Fly ash particles can vary in size from 1 to 100 microns ($4 \times 10^{-5}$ to $4 \times 10^{-3}$ in.), in composition from crystalline minerals to glass, in CaO content from none to 30%, in carbon content from 0% to 15%, and can have various amounts of alkali sulfate in the glass phase. Meininger, R. C. has presented a description of fly ash application to cement in the Concrete International Journal, V.4 No. 5, 52-57 (1982).

The discontinuous polyamide fibers are available from DuPont and other suppliers. A preferred class of the polyamide fibers are the aramid fibers, which are available under the trademark Kevlar ® from DuPont located in Wilmington, Del. These fibers are described in Kirk-Othmer 3;213-242 (1978). The fiber diameter is preferably between about 8 and 15 microns. Kevlar ® has a relatively high ultimate tensile strength and modulus of elasticity. Some basic properties of Kevlar ® fibers are set forth in Table 1.

TABLE 1

| Diameter | Length | Density | Young's Modulus | Poisson's Ratio |
|---|---|---|---|---|
| 10-12 Microns ($5-6 * 10^{-3}$in.) | 6-65 mm ($\frac{1}{4}$-3 in) | 1.44-1.45 | 60-140 GN/m$^2$ (8.7-20.3 × 10$^6$ psi) | 0-0.32 |
| Tensile Strength 2,900 MN/m$^2$ (420 * 10$^3$ psi) | | Elongation at Break % 2-4 | | |

The superplasticizers (water reducers is a synonymous term) are also well known to those skilled in the art. They are described in U.S. Pat. No. 4,310,486 and 4,088,808 to Cornwell et al and 4,495,228 to Cornwell. The water reducers are defined in ASTM C-494, types A and F mixtures. The purpose is to reduce the amount of water necessary to form a sufficiently plastic concrete mixture, (thereby improving the hardened material properties) to reduce setting time and to reduce shrinkage of the hardened (cured) concrete composite. One type of superplasticizer is a mixture of (1) a condensate of formaldehyde and the sodium salt of naphthalene sulfonic acid (90%) and (2) 10% sodium gluconate as described in U.S. Pat. No. 3,686,133. There are numerous types of water reducers which are based upon condensation of alkaline earth metal sulfonate and formaldehyde. The preferred superplasticizer is Daracem ® 100 which is obtained from W. R. Grace, Cambridge, Mass. and described in U.S. Pat. No. 4,460,720. These compositions include an alkali polyacrylate with a molecular weight between 500-25,000 with an alkaline earth lignin sulfonate or alkaline earth polynaphthaleneformaldehyde condensate to reduce the amount of water necessary to form a plastic mixture.

Microsilica (silica fume) is a by-product produced by vapor phase processes for producing silicon or ferrosilicon alloys and is a very finely divided substantially pure silica. It has an average particle size between about 0.05 and 1 micron, preferably an average particle size of about 0.12 micron. The chemical and physical properties of the microsilica are as set forth in Table 2:

TABLE 2

| Chemical % | SiO$_2$ 96.8 | C 1.40 | Fe$_2$O$_3$ 1.15 | MgO 0.20 | Al$_2$O$_3$ 0.15 | K$_2$O 0.04 | Na$_2$O 0.20 |
|---|---|---|---|---|---|---|---|
| Physical | Specific gravity 2.3 | Bulk density 14 lb/ft$^3$ (225 kg/m$^3$) | Specific surface 2,200,000 cm$^2$/g | Average Particle size 0.15 microns | | | Particles smaller than 45 microns (0.018 |

TABLE 2-continued

| | |
|---|---|
| $(6 \times 10^{-5}$ in) in) | |
| | 99.5% |

The microsilica coated polyamide (preferably aramid) fibers play the key role in the improved composite material. Microsilica particles are relatively small (compared to cement particles) and in a moist condition effectively coat the small diameter polyamide fibers. This coating is essential for uniformly dispersing the fibers inside the Portland cement matrix using conventional mixing techniques. Hence, the first step in the construction of the fluid cementitious composition, is to disperse the polyamide fibers in a microsilica-water-superplasticizer mixture. The use of a superplasticizer provides workability of the fluid cementitious composition which is adversely influenced by the presence of microsilica and fibers.

Microsilica, due to the small diameter of its particles, is believed to fill the voids between the relatively large particles of cement. This helps not only to improve the microstructure and consequently the mechanical characteristics of the composition, but also greatly enhances the bond between the polyamide fibers and microsilica-cement mixture. In the mix sequence, after the polyamide fibers are dispersed in a microsilica-superplasticizer-water mixture, the remainder of the water-superplasticizer together with the cement are added to the mix, and mixing of the complete composition is accomplished by continuing the regular mixing action.

Another important affect of microsilica in the polyamide fiber, microsilica-cement composite is its ability to reduce the alkalinity of the composition. This enhances the durability of polyamide fiber in the alkaline environment of Portland cement which destroys the strength of the polyamide fibers over time, especially at higher temperatures.

The hardened polyamide fiber microsilica-cement composite exhibits highly desirable strength and deformation characteristics under different stress systems. The polyamide fibers are highly effective in preventing the up to the peak tensile stresses. This function of polyamide fibers is the key to substantially increasing the ultimate strength of t material under tensile stress systems. In the post-peak region, the desirable bond between polyamide fibers and the balance of the microsilica-cement composition helps in greatly improving the ductility and energy absorption capacity of the material. This is achieved by the capability of the well-bonded polyamide fibers of producing multiple cracking, thereby reducing the widths of individual cracks, and bridging the wide cracks for preserving the tensile resistance after substantial widening of the cracks.

The weight ratio of superplasticizer to Portland cement is between 0.02 and 0.20, preferably 0.08 to 0.12. The weight ratio of water to cement is between about 0.25 and 0.7, preferably 0.325 to 0.45. The weight ratio of microsilica to cement is preferably between about 0.2 and 0.4, preferably 0.3. Up to 45% by weight of Portland cement, preferably 20%, can be substituted with fly ash and aggregates with maximum sizes as large as 25 mm, preferably 9 mm, might fill up to 75% of the composite volume, preferably 50%. The volume ratio of fibers to total volume of the composite material is between about 0.0005 and 0.04.

SPECIFIC DESCRIPTION

The preferred mix proportions of polyamide fiber microsilica and cement composite were as follows:

Aramid (Kevlar ®) fiber length-⅛ inch (0.32 cm) to ½ inch (1.27 cm).

Aramid fiber (by volume)-0.05 to 3%. It should be noted that the presence of coarser aggregates tends to limit the maximum fiber volume fraction that can be conveniently incorporated into the matrix.

Microsilica to cement ratio (by weight)-0.2 to 0.4.
Water to cement ratio (by weight)-0.3 to 0.45.
Superplasticizer to cement ratio (by weight)-0.02 to 0.10.

In the mixes with aggregates having maximum sizes up to ⅜" (9 mm) filling up to 50% of the total composite volume, and fly ash substituting up to 20% (by weight) of cement, mixing of the composite can be performed either in a conventional mortar mixer (for the cases with no aggregates or with aggregates of maximum sizes below 3/16" (4.5 mm)). A regular concrete mixer can be used with aggregates of maximum sizes above 3/16" (4.5 mm).

The typical mixing sequence in a conventional Mortar TM mixer (for mixes with no aggregates or only fine ones) was:

1. Add the microsilica and ⅔ of the mixture of water and superplasticizer to the mixer, and mix at low speed (53 rpm) for 1 to 2 minutes.
2. Slowly add the aramid fibers while the mixer is running in a period of about 3 to 5 minutes. This step should be followed by the addition of fine aggregates (if any) in a period of about 1 minute.
3. Add ⅓ of the cement, half of the remaining water and superplasticizer mixture, the rest of cement, and finally the rest of the water and superplasticizer mixture to the mixer within 3 to 6 minutes, with the mixer running continuously.
4. Turn the mixer to medium speed (99 rpm) and mix for 1 minute in order to achieve a complete dispersion of the mix ingredients.
5. Place the mix in the forms and compact by vibration. Keep the material inside forms for about 24 hours under cover, and then demold.
6. Curing was performed in a moist room (100% relative humidity and 73° F.) for about 10 days before the specimens were tested.

The typical mixing sequence in a conventional concrete mixer (for mixes with coarse aggregates and thus lower fiber volume fractions) was:

1. Add a fraction of sand having a weight from 1 to 3 times that of microsilica to the mixer, and start the mixer.
2. Add a fraction of water having a weight from 1.2 to 1.8 times that of microsilica, a fraction of superplasticizer having a weight from 5 to 10% that of microsilica, and then all of the microsilica to the mixer.
3. Mix for 2 minutes or until a uniform stiff and sticky mixture has been achieved.
4. Slowly add the aramid fibers while the mixer is running in a period of about 3 to 5 minutes.
5. Add about half of the remaining sand, half of the cement and half of the remaining water and superplasticizer, and mix for about 2 minutes.
6. Add to the above mixture, the remainder of cement, water plus superplasticizer and sand. Mix for about 3 minutes.

7. The curing conditions applied to conventional concrete are applied to this material.

EXAMPLE 1

A fresh mix of microsilica and water at equal weights, together with superplasticizer in an amount of about 25% by weight of water was found to be a desirable dispersant for aramid fibers Kevlar ® with lengths ranging from ⅛" to ½" (0.32 to 1.27 cm). The mixing sequence was as follows:

1. The mixer was loaded with the dispersant described above, and the fibers were gradually added with mixing at a slow rate (53 rpm).
2. While the mixing continued, ¼ to ⅓ of the cement was added, then half of the remaining water and superplasticizer followed by the remainder of the cement and the water and superplasticizer in sequence
3. The mixing speed was changed to medium speed (99 rpm) and the mixing was continued for 1 minute. The mix proportions based upon the cement used were as follows:
   Fiber length = ⅛ in. (0.32 cm)
   Water-to-cement ratio (by weight) = 0.325
   Microsilica-to-cement ratio (by weight) = 0.300
   Superplasticizer-to-cement ratio (by weight) = 0.104
   Fiber (by volume) = 3%

This mix was relatively fast-setting, but still workable enough to be cast.

Three flexural specimens (1.5×1.5×6.5 in; 3.75 cm×3.75 cm×16.5 cm) were cast with this mix, and they were stored under plastic sheet. The flexural specimens were then demolded and were stored in a curing room. This room had a relative humidity of about 100% and a temperature of about 25° C.

EXAMPLE 2

The second mix that was tried is described below:
Fiber length = ½ in (1.27 cm)
Water-to-cement ratio (by weight) = 0.325
Microsilica-to-cement ratio (by weight) = 0.3
Superplasticizer-to-cement ratio (by weight) = 0.104
Fiber (by volume) = 1%.

This mix was very fast-setting and unworkable. It was determined that for longer fibers at 1% by volume the fluidity of the mix had to be increased by increasing the water content.

EXAMPLE 3

The following matrix mix proportions were tried with 0%, 0.4%, 0.8% and 1% volume fraction of ½ inch (1.27 cm) aramide (Kevlar ®) fibers:
   Water-to-cement ratio = 0.4
   Microsilica-to-cement ratio = 0.3
   Superplasticizer-to-cement ratio = 0.1

The mixing method was the same as set forth in Example 1. The workability in all cases was good. However, some finishability (rough surface texture) problems resulted as the volume fraction of ½ inch (1.27 cm) Kevlar TM fiber increased. This did not inhibit the casting of the specimens. Three flexural specimens, two compressive specimens (3 in (7.6 cm) diameter by 6 in (15.2 cm) high cylinders), 3 tension specimens (standard ASTM briquets), and three impact specimens, (6 in (15.2 cm) diameter by 2.5 in (6.34 cm) high cylinders) were cast from each mix. All the specimens were stored under plastic sheets. All the specimens cast the day before were removed from the molds and stored in the curing room.

A preliminary flexural test series was performed on the specimens with water to cement ratio of 0.325 and fiber length of ⅛ in (0.32 cm). In this preliminary test, the concern was to assess the affect of the aramid (Kevlar ®) on flexural strength. No measurements of deformations were made in the specimen tests. The flexural test was performed on a beam span of 4.8 in (12.19 cm) with the load on the center of the beam.

The following maximum values of center point load were obtained: 675 lbs, 717 lbs. 791 lbs (306 kg, 326 kg 359 kg). The measured cross-sectional dimensions were roughly 1.6 in (4.06 cm) height and 1.5 in (3.8 cm) width. Hence, the average flexural strength of this specific aramid (Kevlar ®) fiber microsilica-cement composite was 1150 psi (80.8 kg per sq. cm.). The specimens cast in Example 3 were tested in flexure, direct tension, compression and under impact loading. FIG. 1(a) shows the flexural load deflection diagrams, FIG. 2 the direct tension stress-strain diagrams, FIG. 3 the compressive load-deflection (stress-strain) relationship and FIG. 4(a) the impact resistance of the test specimens of fiber cement-microsilica composites with 0, 0.4, 0.8 and 1% Kevlar fiber (½ in; 1.27 cm) volume fractions.

The flexural strength and toughness of the cementitious matrix were substantially enhanced as a result of reinforcement with the polyamide (preferably Kevlar ®) fibers. The flexural behavior, especially at the low fiber volume fraction for the ½ in (1.27 cm) fibers was marked by multiple cracking in critically stressed regions. This is a highly desirable phenomenon that limits the crack widths, and results in superior post-peak-resistance, ductility and energy absorption capacity of the material. The ability to develop closely spaced multiple cracks (instead of pull-out of fibers at a single crack) is an indication of a desirable bond produced, and is attributed to the presence of microsilica particles which can fill in the voids between the relatively large cement particles adjacent to the fibers.

Figure 4A:
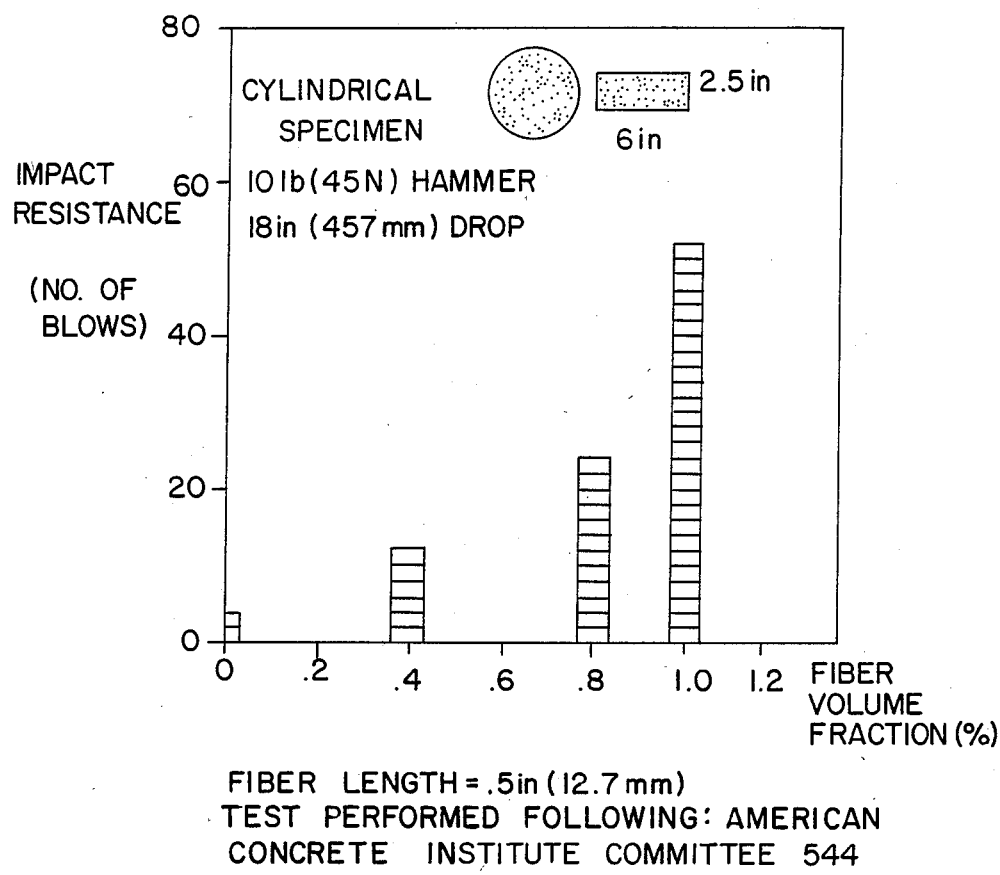
FIG. 4(a) is a graph showing the impact resistance for a standard cylindrical specimen (measuring 2.5" (6.35 cm) long and 6" (15 cm) in diameter prepared according to the method of the present invention without added aggregates.
Figure 4B:
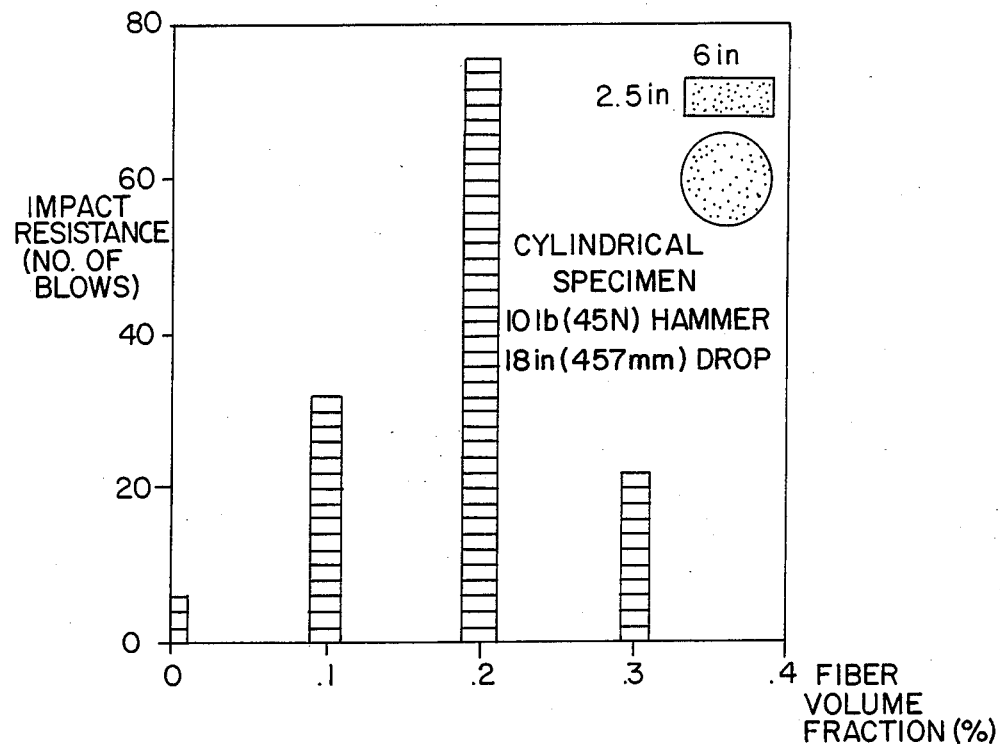
FIG. 4(b) shows similar results for the core with added aggregates. The impact tests were performed following American Concrete Institute Committee 544.

In direct tension the increase in polyamide fiber content substantially increases the tensile strength as well as the ductility and energy absorption capacity of the cementitious matrix in tension. The increase in strength is almost proportional to fiber volume fraction and the increase in ductility and energy absorption capacity is especially significant at the higher (1%) fiber volume fraction. In compressions, the increase of fiber volume fraction from 0 to 1% first increased (up to 0.8%, volume fraction) and then decreased the strength of the cementitious composite. The compressive strength at 0.8% fiber content was about 5 times that of plain specimens, and the compressive energy absorption capacity at 0.8% fiber volume fraction was also above that of the plain specimen. The significant improvements in the impact resistance of microsilica cementitious materials resulting from reinforcement with polyamide (Kevlar) fibers are shown in FIG. 4(a).

EXAMPLE 4

In order to investigate the possibility of producing a dry pre-mix which facilitates the manufacturing of the product with minimum effort (e.g. manual mixing by a trowel) in the field condition, an alternative approach to manufacturing of the material was developed and tried. In this approach, the following mix proportion (by weight) was used:
   Water-cement ratio = 0.45
   Microsilica-cement ratio = 0.3
   Superplasticizer (Duracem 100)-cement ratio = 0.10

Kevlar Fiber volume fraction = 1%
Fiber length = ¼ inch.

The dry premix consisted of all the microsilica and the Kevlar fibers, which can be mixed either manually or using a mixer.

Following the preparation of the dry mix, ⅔ of the combination of water and superplasticizer was added to the dry premix, and a trowel was used to manually produce a uniform mixture. This process took 3 minutes (when 1000 g of microsilica was used). Then cement and water plus superplasticizer were added gradually, as the manual mixing continued, over a period of 3 minutes. This led to a reasonably uniform mix which was consequently cast and compacted by external vibration. These flexural specimens were cast and cured as described earlier.

A standard flexural test on 1.5×1.5×6.5 in (38.1×38.1×165.1 mm) with center point loading and a span of 4.8 in (121.9 mm) resulted in ultimate flexural load values of 524, 330 and 360 lbs (2334, 1470 and 2495 N). The average ultimate flexural load was 471 lbs (2100 N). A similar mix manufactured in mortar mixer following the previously mentioned regular mixing technique resulted in a mixture which had an ultimate flexural load of 890 lbs (3073 N) obtained in similar flexural test conditions. It may thus be concluded that the dry premix made it possible to use manual mixing techniques for the construction of the new cementitious composite with only a limited loss in the flexural strength of the material, when compared with the mix constructed using a mortar mixer.

Characterization of Results

Figure 1B:
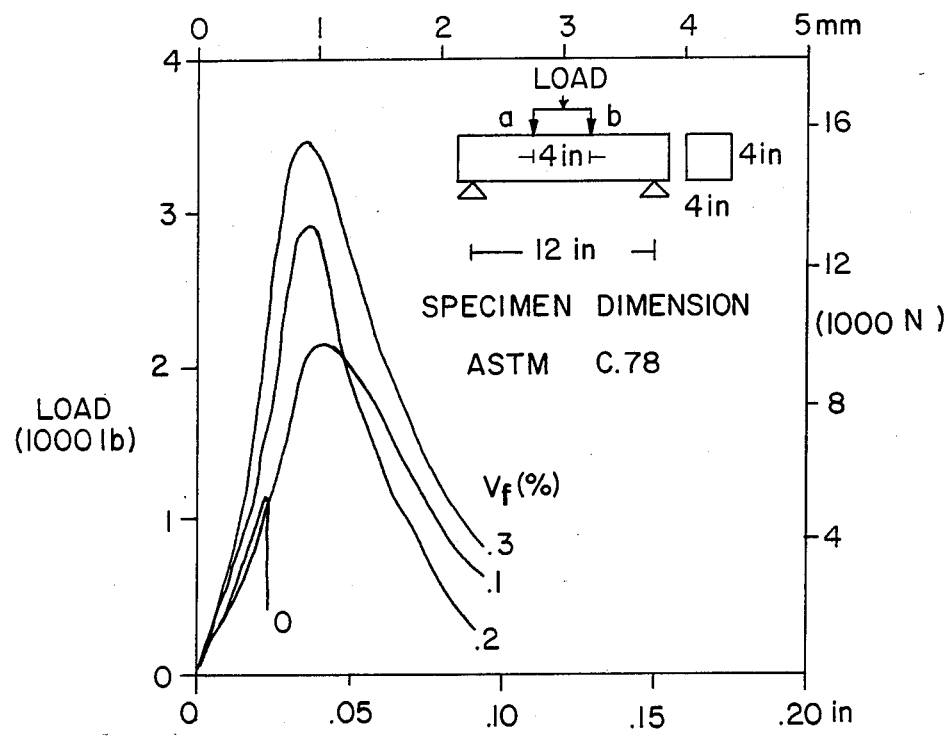
FIG. 1(b) is a similar graph for test beams (measuring 4"×4" with 12" (10 cm×10 cm×30 cm) between support points and the load at one-third points) performed according to the method of the present invention with added aggregates. All the flexural tests were prepared according to ASTM 349-86 or ASTM C78-84.
Figure 2:
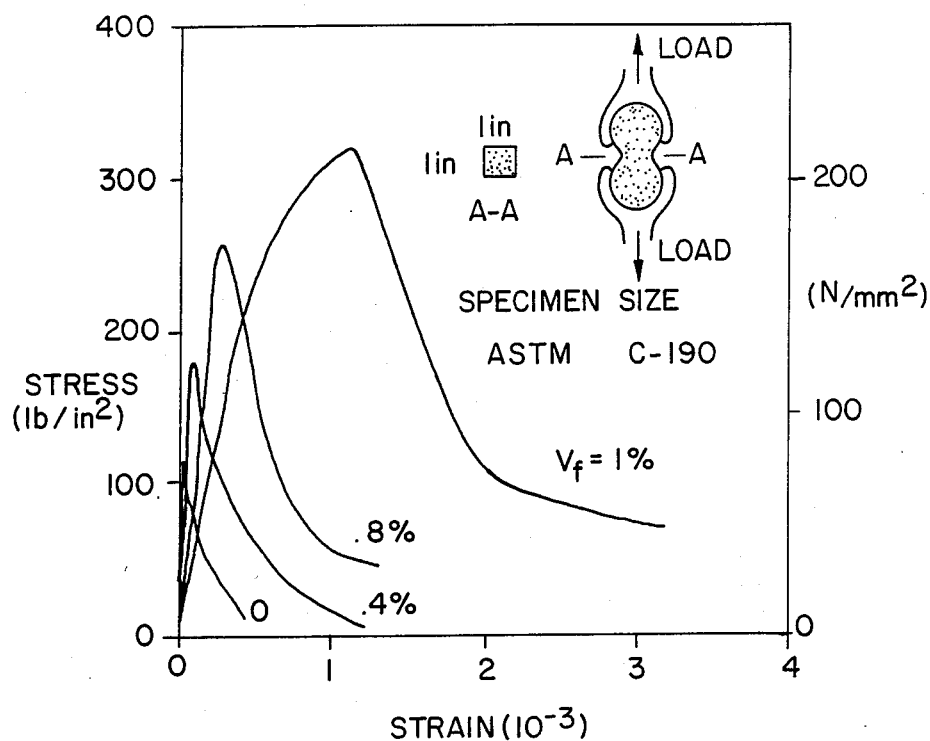
FIG. 2 is a graph showing tensile strength vs. strain for a standard ASTM cement sample prepared according to the method of the present invention without added aggregates. The tensile tests were performed according to ASTM C190-85.
Figure 3:
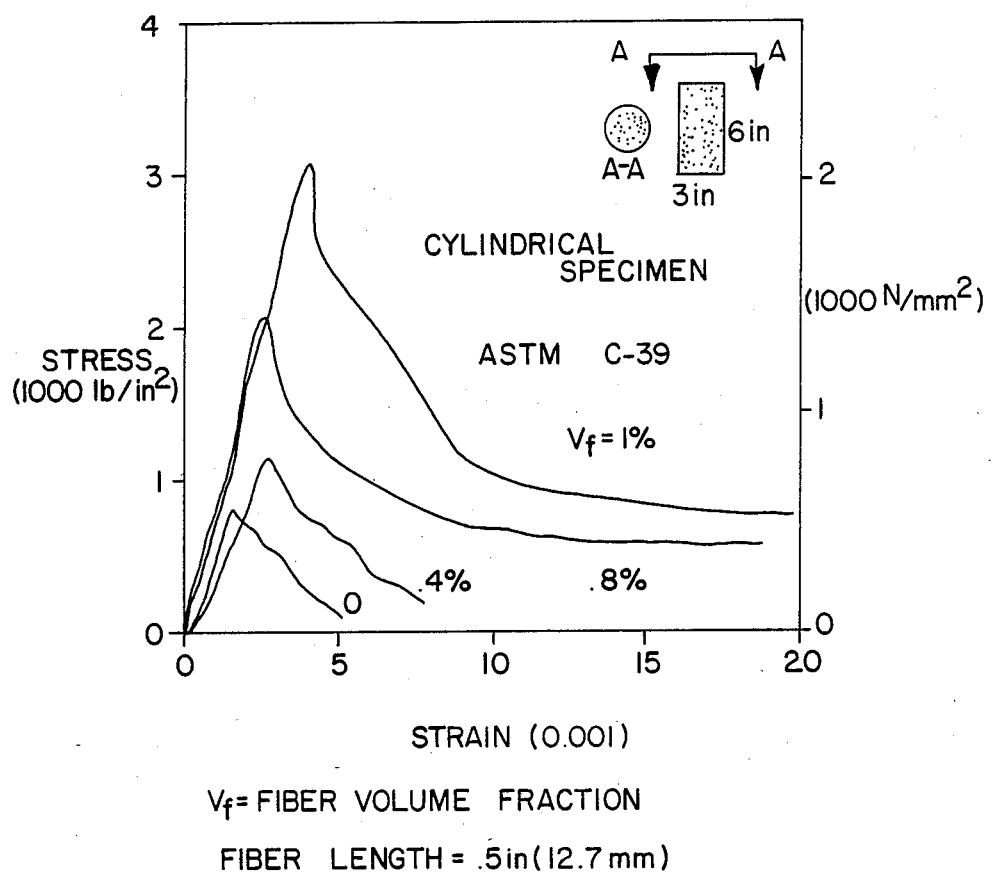
FIG. 3 is a graph showing compressive stress vs strain for a cylindrical specimen (measuring 6" (15.2 cm) long and 3" (7.6 cm) in diameter prepared according to the method of the present invention without added aggregates. The compressive tests were performed according to ASTM C39-84.

The flexural load-deflection curves set forth in FIG. 1 show the superior load and deformation capacities exhibited by fiber, microsilica and cement composites. Tensile and compressive strengths and ductilities shown in FIGS. 2 and 3 are indicative of the desirable performance of the new material, especially that unlike the materials produced by Konczalski et al and Walter et al, the new compositions has been manufactured using economical conventional mixing techniques that are easily reproducible in plant and field conditions. The compositions were hardened for at least 7 days before testing.

The key problems solved in developing the new composite were related (1) to uniform dispersion of the polyamide fibers through the conventional mixing procedure. (2) improving the workability of the fresh plastic or fluid mix such that it can be conveniently placed and compacted, (3) reducing the alkalinity of the cementitious environment for improving the durability of the polyamide fibers, (4) deciding the mix sequence, and (5) determining typical mix proportions with desirable fresh mix workability and fiber dispersability which exhibit superior mechanical and durability characteristics. The problems of fiber dispersion and reduction of the matrix alkalinity were solved through the use of the microsilica and development of a microsilica-water-superplasticizer dispersant for the polyamide fibers. The mixing procedure produced a uniform fiber dispersion. The problems with the workability of the fresh mix and its fast setting were resolved through the use of relatively high dosages of superplasticizer and a proper selection of the water content of the mix. Care was taken to stay within those ranges of fiber volume fraction, water content, and microsilica-cement ratio (with due consideration to the aggregate content) which not only give desirable fresh mix workability and fiber dispersability, but also desirable long-term characteristics in the hardened state.

The superior mechanical characteristics of the improved polyamide fiber microsilica-to cement composites result, to a large extent, from the desirable performance of this specific composite under tensile stress systems. This desirable behavior is achieved first of all by the fact that microsilica with its small particles coats the fibers and helps in breaking the fiber balls and achieving a uniform dispersion of randomly oriented fibers. Under increasing tensile stresses, the propagation of microcracks in cementitious matrices leads to the formation of an unstable crack system which marks the achievement of the ultimate tensile strength. Polyamide fibers have relatively small diameters, and thus there is a large number of polyamide fibers inside the mix at a certain volume fraction of fibers of a specific length. Hence, when uniformly dispersed, the fibers are closely spaced inside the mix and this is essential in effectively preventing the propagation of microcracks. This is the reason why the polyamide fiber, microsilica and cement composite behaves very desirably as far as the pre-peak properties and ultimate strength under tension is concerned. In the post-peak region, the polyamide fiber, microsilica and cement composition behaves ideally in preventing the widening of cracks. The small microsilica particles fill in the voids between the large cement particles and develop a superior interfacial bond to the small-diameter polyamide fiber. This bond makes it possible to: (a) make an optimum use of the very high tensile strength of fibers; and (b) develop multiple cracks which play an important role in reducing the width of the individual cracks. With the well-bonded polyamide fibers in the microsilica-cement composite, a high level of tensile resistance can be maintained in the post-peak region across the cracks. The excellent bond between polyamide fibers and the matrix is especially advantageous because polyamide fibers have a relatively high tensile strength leading to the development of high interfacial bond stresses under tension. In the post-peak region, the highly desirable ductility of the material in tension results from the polyamide fiber extension and the fiber slippage at relatively high fiber pull out forces and interfacial bond stresses. The fact that, in the presence of microsilica, the relatively long (e.g. ½ inch; 1.27 cm) polyamide fibers can be dispersed inside the matrix is very beneficial because this secures a higher pull-out resistance which is maintained at larger crack widths. In the long term, the advantages of polyamide fiber reinforcement in cementitious composites continue to be effective if, among other things, the polyamide fibers are prevented from deteriorating in the highly alkaline environment typically created by Portland cement. Microsilica also helps in this regard by lowering the alkalinity of the cementitious matrix, thereby improving the durability of polyamide fibers which could be damaged by long-term exposure to a highly alkaline environment, especially at high temperatures.

The polyamide fiber, microsilica and cement composite with its relative ease of construction and superior material characteristics, is superior to the polyamide fiber-Portland cement composites which do not incorporate microsilica. Other products with which polyamide fiber, microsilica and cement composite should compete in the market are carbon fiber reinforced cement, asbestos cement, and wood fiber reinforced cement. Compared to the polyamide fiber, microsilica and cement composite, carbon fiber reinforced cement can not improve the post-peak behavior and ductility of the cement matrix because the fibers are relatively short (to overcome dispersing problems) and also because carbon fibers do not seem to bond as well as aramid fibers to cementitious matrices. Asbestos cement is a health hazard and is no more a competitive material in many applications. Wood fiber reinforced cement is not durable even under moderate exposure conditions due to the instability of the wood and the wood fiber-cement interface. Hence, the lower cost of wood fiber reinforced cement, compared to the polyamide fiber, microsilica and cement composite, can not make it a better material for many applications.

The following are unexpected advantages of the present invention:

(1) multiple cracking of the matrix due to the superior interfacial bond between the polyamide fibers and the cement, leading to a highly desirable post-peak resistance.

(2) Achievement of high strength and high ductility in a relatively short period after construction.

(3) Easier dispersion of the highly effective longer polyamide fibers in the matrix than the less effective shorter fibers.

(4) Major improvements in the ductility of the material under compression without damaging the compressive strength.

(5) The greatly improved ability of the material to maintain its integrity under impact loads or large deformations.

(6) Simultaneous increase in the tensile and flexural strength and post-peak resistance in tension and flexure.

The polyamide fiber, microsilica and cement composite can substitute for asbestos cement in applications such as wall and floor panels, tiles, and is also potentially applicable to shotcreting and repair, building blocks, boats, and impact-resistant panel type structures. The material can be used in the building and construction industry. In the presence of aggregates, the polyamide fiber, microsilica and cement composite can find applications in practically any area where the conventional concrete has found applications. Polyamide fiber microsilica-cement composites can compete with carbon fiber or glass fiber reinforced cement, asbestos cement and wood fiber reinforced cement to open its market. It is superior to carbon fiber reinforced cement because of its high ductility, to glass fiber reinforced cement because of the higher efficiency and better durability of the polyamide fibers in cementitious environments, to asbestos cement because of the asbestos health problems, and to wood fiber cement due to the serious problems with the durability of wood fibers.

It is intended that the foregoing description be only illustrative of the present invention and that the present invention be limited only by the hereinafter appended claims.

We claim:

1. In a plastic cementitious composition which cures to a rigid hardened cementitious composite is produced by incorporating in a mixture Portland cement, a superplasticizer, discontinuous polyamide fibers, water and up to 75% of the composite volume of aggregates and wherein fly ash may be substituted for part of the Portland cement, wherein the superplasticizer reduces than amount of water necessary to produce the plastic cementitious composition, the improvement which consists essentially of:

microsilica coated on the fibers in the plastic, wherein the microsilica aids in the dispersion of the fibers in the plastic cementitious composition and forms a thin coating on the fibers in a mixture of water and a portion of the superplasticizer prior to admixture with the cement, wherein particles of the microsilica have an average size between about 0.05 and 1 micron, wherein the microsilica retards alkaline deterioration of the polyamide fibers over time in the rigid hardened cementitious composite and wherein the rigid hardened cementitious composite with the microsilica exhibits greater flexural loading and tensile strength than a similar composite with the fibers and without the microsilica.

2. The composition of claim 1 wherein the fibers have a length between about 3 and 65 mm and a diameter between about 8 and 15 microns.

3. The composition of claim 1 as a hardened cementitious composite.

4. The composition of claim 1 wherein the polyamide fiber is an aramid fiber.

5. A plastic cementitious composition which cures to a hardened cementitous composite which consists essentially of in admixture:

(a) Portland cement;

(b) superplasticizer in a ratio by weight of between about 0.02 and 0.20 of the superplasticizer to the Portland cement, wherein the superplasticizer reduces the amount of water necessary to provide the plastic cementitious composition;

(c) discontinuous polyamide fibers having a diameter between about 8 and 15 microns and a length between about 6 and 65 mm in a ratio by volume of between about 0.0005 and 0.04 of the fibers to the cementitious composition, wherein the fibers have been dispersed in, and thinly coated with, microsilica particles and part of the superplasticizer from part (b) in water prior to being provided in the admixture and wherein the particles of the microsilica have a size of between about 0.05 and 1 micron;

(d) water in a ratio by weight of between about 0.25 and 0.7 of the water to the Portland cement;

(e) fly ash substituting for up to 45% by weight of Portland cement; and (f) aggregates with maximum sizes up to 25 mm filling up to 75% of the volume of the composite, wherein the plastic cementitious composition consists essentially of amounts of the water, the aggregates, the fibers, the superplasticizer, the cement and the fly ash so as to be castable, wherein the microsilica regards alkaline deterioration of the polyamide fibers over time in the rigid hardened cementitious composite and wherein the rigid hardened cementitious composite exhibits greater flexural loading and tensile strength than a similar composite with the fibers and without the microsilica.

6. The composition of claim 5 as a hardened cementitious composite.

7. The composition of claim 5 wherein the fibers have a diameter between about 10 to 12 microns and have a length of about 3 to 2 mm.

8. The composition of claim 5 wherein the weight ratio of the water to the Portland cement is between about 0.3 to 0.45 and the weight ratio of the superplasticizer to the Portland cement is between about 0.02 and 0.10.

9. The composition of claim 5 with aggregates, wherein the volume fraction of aggregates is an amount up to 50% and the maximum size is up to 9 mm, and fly ash substitutes in an amount up to 20% by weight of portland cement.

10. The composition of claim 5 wherein the ratio of the microsilica to the Portland cement is between about 0.2 and 0.4.

11. The composition of claim 5 wherein the fibers have a diameter between about 10 to 12 microns and have a length of 3 to 12 mm, wherein the weight ratio of the water to the Portland cement is between about 0.3 and 0.45 and the ratio of the superplasticizer to the Portland cement is between about 0.02 and 0.10 and wherein the weight ratio of the microsilica to the Portland cement is between about 0.2 and 0.4.

12. The composition of claim 11 with aggregates wherein the volume fraction of aggregates being present in an amount up to 50% of the composite and the maximum size being up to 9 mm, and wherein fly ash is present in an amount up to 20% by weight of Portland cement.

13. In a method of preparing a plastic cementitious composition which cures to a hardened cementitious composite incorporating in a mixture of Portland cement, a superplasticizer, discontinuous polyamide fibers, water and up to 75% of the composite volume of aggregates and wherein fly ash may be substituted for part of the Portland cement, wherein the superplasticizer reduces the amount of water necessary to produce the improvement which consists essentially of:
(a) thinly coating the fibers in a part of the water and in part of the superplasticizer with microsilica, and a specific fraction of the aggregates, needed for fiber dispersion so that the fibers are uniformly dispersed and have a thin coating of the microsilica, the water and the superplasticizer; and
(b) mixing the microsilica coated and uniformly dispersed fibers in the remainder of the mixture, wherein the plastic cementitious composition consists essentially of amounts of the water, the aggregates, the fibers, the superplasticizer, the cement and the fly ash so as to be castable in a mold wherein the microsilica retards alkaline deterioration of the polyamide fibers over time in the rigid hardened cementitious composite and wherein the rigid hardened cementitious composite with the microsilica exhibits greater flexural loading and tensile strength than a similar composite with the fibers and without the microsilica.

14. The method of claim 13 wherein between about $\frac{1}{4}$ and $\frac{1}{2}$ of the water and the superplasticizer are admixed with the fibers in step (a).

15. The method of claim 13 wherein a portion of the Portland cement and aggregates is admixed with the coated fibers from step (a) and then part of the remainder of the water and superplasticizer, then the remainder of the Portland cement and aggregates and then the remainder of the water and superplasticizer are mixed in order.

16. The method of claim 13 wherein the plastic cementitious composition is cured for at least about 7 days at ambient outside conditions and more rapidly at higher humidity and high temperature.

17. The method of claim 13 wherein the fibers have a length between about 3 and 65 mm and a diameter of about 8 to 15 microns.

18. The method of claim 13 wherein the microsilica has an average particle size between about 0.05 and 1 micron.

19. The method of claim 13 wherein the polyamide fiber is an aramid fiber.

* * * * *

UNITED STATES PATENT AND TRADEMARK OFFICE
CERTIFICATE OF CORRECTION

PATENT NO. : 4,902,347
DATED : February 20, 1990
INVENTOR(S) : Parviz Soroushian et al It is certified that error appears in the above—identified patent and that said Letters Patent is hereby corrected as shown below:

Column 5, line 43, after "preventing" the following should be inserted --propagation of microcracks and stabilizing the crack system--.

Column 5, line 46 "t" should be --the--.

Column 11, line 62, after "composite", --and-- should be inserted.

Column 11, line 68, "than" should be --the--.

Signed and Sealed this

Fifth Day of March, 1991

*Attest:*

HARRY F. MANBECK, JR.

*Attesting Officer*     *Commissioner of Patents and Trademarks*